United States Patent
Choi et al.

(10) Patent No.: US 8,349,903 B2
(45) Date of Patent: *Jan. 8, 2013

(54) DISPERSANT FOR CARBON NANOTUBES AND CARBON NANOTUBE COMPOSITION COMPRISING THE SAME

(75) Inventors: Jae Young Choi, Suwon-si (KR); Seong Jae Choi, Seoul (KR); Hyeon Jin Shin, Suwon-si (KR); Seon Mi Yoon, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 1038 days.

This patent is subject to a terminal disclaimer.

(21) Appl. No.: 11/829,620

(22) Filed: Jul. 27, 2007

(65) Prior Publication Data

US 2011/0003907 A1 Jan. 6, 2011

(30) Foreign Application Priority Data

Feb. 27, 2007 (KR) .................. 10-2007-0019534
May 30, 2007 (KR) .................. 10-2007-0052574

(51) Int. Cl.
*B01F 3/08* (2006.01)
*C09K 3/00* (2006.01)
*C08G 75/00* (2006.01)
*C08G 75/32* (2006.01)
*C08G 59/00* (2006.01)
*C08G 65/00* (2006.01)
*C08G 73/06* (2006.01)

(52) U.S. Cl. ............ 516/32; 528/377; 528/417; 528/424
(58) Field of Classification Search .................. 528/377, 528/417, 424; 516/32

See application file for complete search history.

(56) References Cited

U.S. PATENT DOCUMENTS

| | | | | | |
|---|---|---|---|---|---|
| 5,744,523 | A | * | 4/1998 | Barkowsky et al. | 523/523 |
| 6,166,172 | A | * | 12/2000 | McCullough et al. | 528/380 |
| 6,602,974 | B1 | * | 8/2003 | McCullough et al. | 528/73 |
| 6,676,857 | B2 | * | 1/2004 | Heeney et al. | 252/500 |
| 7,452,958 | B2 | * | 11/2008 | McCullough et al. | 528/73 |
| 7,807,776 | B2 | * | 10/2010 | Heeney et al. | 528/380 |
| 7,837,902 | B2 | * | 11/2010 | Hsu et al. | 252/500 |
| 7,837,903 | B2 | * | 11/2010 | Liu et al. | 252/500 |
| 2004/0024171 | A1 | * | 2/2004 | McCullough et al. | 528/380 |
| 2004/0030091 | A1 | * | 2/2004 | McCullough et al. | 528/378 |

(Continued)

FOREIGN PATENT DOCUMENTS

JP 2004339301 12/2004

(Continued)

OTHER PUBLICATIONS

Berthelot et al. (Electrochemistry Communications 3 (2001) 557-560).*

(Continued)

*Primary Examiner* — Liam Heincer
(74) *Attorney, Agent, or Firm* — Cantor Colburn LLP

(57) ABSTRACT

The present invention discloses a dispersant for carbon nanotubes having excellent dispersion ability and to a carbon nanotube composition including the dispersant. In the dispersant, the heads and tails of the dispersant are regioregularly arranged in one direction, and the structural properties of the dispersant are controlled such that the ratio of heads to tails is 1 or more, thereby effectively stabilizing and dispersing carbon nanotubes in various dispersion media, such as an organic solvent, water, a mixture thereof and the like, compared to conventional dispersants.

15 Claims, 4 Drawing Sheets

U.S. PATENT DOCUMENTS

| | | | |
|---|---|---|---|
| 2004/0127592 A1* | 7/2004 | Heeney et al. | 522/6 |
| 2005/0187370 A1* | 8/2005 | McCullough et al. | 528/73 |
| 2005/0224788 A1* | 10/2005 | Hsu et al. | 257/40 |
| 2006/0118768 A1 | 6/2006 | Liu et al. | |
| 2006/0155105 A1* | 7/2006 | Werner et al. | 528/377 |
| 2007/0078215 A1* | 4/2007 | Yoon et al. | 524/495 |
| 2007/0117963 A1* | 5/2007 | Ong et al. | 528/377 |
| 2008/0086081 A1* | 4/2008 | Eidenschink et al. | 604/96.01 |
| 2008/0088219 A1* | 4/2008 | Yoon et al. | 313/326 |
| 2008/0171193 A1* | 7/2008 | Yi et al. | 428/327 |
| 2008/0315751 A1* | 12/2008 | Sheina et al. | 313/503 |
| 2009/0001325 A1* | 1/2009 | Huo et al. | 252/511 |
| 2009/0020732 A1* | 1/2009 | Shin et al. | 252/503 |
| 2009/0043052 A1* | 2/2009 | McCullough et al. | 525/417 |
| 2009/0118420 A1* | 5/2009 | Zou et al. | 524/577 |
| 2010/0179368 A1* | 7/2010 | Conrad | 588/299 |

FOREIGN PATENT DOCUMENTS

| | | |
|---|---|---|
| JP | 2004339301 A | 12/2004 |
| JP | 2006248888 A | 9/2006 |
| WO | 03/029354 | 4/2003 |

OTHER PUBLICATIONS

Dispersion of Single-Walled Carbon Nanotubes of Narrow Diameter Distribution; Yongqiang Tan and Daniel E. Reasco; J. Phys. Chem B 2005, 109, 14454-14460.

"End Group Modification of Regioregular Polythiophene through Postpolymerization Funtionalization"; Authors: Jinsong Liu, et al.; Macromolecules 2002, 35 (9882-9889).

"Interactions between Conjugated Polymers and Single-Walked Carbon Nanotubes"; Authors: David W. Steuerman; Journal of Physical Chemistry B. Materials, Sirfaces, Interfaces, and Biophysical vol. 106, No. 12 (2002).

European Search Report dated Jun. 26, 2008; Reference: RZ/P40401EP.

* cited by examiner

DISPERSANT FOR CARBON NANOTUBES AND CARBON NANOTUBE COMPOSITION COMPRISING THE SAME

CROSS-REFERENCE TO RELATED PATENT APPLICATIONS

This application claims the benefit of Korean Patent Application No. 10-2007-19534, filed on Feb. 27, 2007, the disclosure of which is incorporated herein in its entirety by reference.

BACKGROUND OF THE INVENTION

1. Field of the Invention

The present disclosure relates to a dispersant for carbon nanotubes. In particular, this disclosure relates to a dispersant that promotes excellent dispersion of carbon nanotubes in a composition.

2. Description of the Related Art

Carbon nanotubes (CNT) are tubular molecules in which one carbon atom is bonded with other carbon atoms in a honeycomb arrangement. Carbon nanotubes generally can have a single wall (single wall carbon nanotubes) or multiple walls (multi-wall). Single wall carbon nanotubes have diameters of about 0.7 to about 3 nanometers, while multiwall carbon nanotubes have diameters of about 3.5 to about 500 nanometers. Carbon nanotubes generally have aspect ratios of about 5 to about 10,000. Single wall carbon nanotubes generally exist in the form of ropes due to Vander Waals forces. Carbon nanotubes also exist in the form of bundles called aggregates.

Carbon nanotubes have excellent mechanical properties, high electrical selectivity, excellent field emission properties, and high-efficiency hydrogen storage medium characteristics. Further, carbon nanotubes can exhibit either semiconducting or metallic properties. These various types of carbon nanotubes have different energy gaps and exhibit a peculiar quantum effect because they have a quasi-one-dimensional structure.

Various methods can be used to produce carbon nanotubes such as an electric discharge method, a pyrolysis method, a laser deposition method, a plasma chemical vapor deposition method, a thermal chemical vapor deposition method and an electrolysis method.

Further, since carbon nanotubes have high electrical conductivity, they are used for forming conductive films, and the likelihood that carbon nanotubes will be used in various functional complexes, such as probes of a field emission display (FED) and a scanning probe microscope (SPM), or the like, in the future is increasing. Accordingly, research on carbon nanotubes is increasing feverishly.

Meanwhile, in order to form a conductive film using carbon nanotubes or to apply carbon nanotubes to functional complexes, it is desired that the carbon nanotubes be dispersed in a suitable dispersion medium. However, since carbon nanotubes have a very large surface attractive forces, such as the van der Waals force, which is the force between molecules, carbon nanotube particles easily aggregate with each other to form ropes. This aggregation phenomenon hinders the formation of a three-dimensional structure, which can improve the mechanical strength and conductivity thereof. Accordingly, in order to increase the applicability of carbon nanotubes, technologies for dispersing carbon nanotubes using a suitable dispersant are desired. However, currently, the application of carbon nanotubes is limited due to the ineffectiveness of these dispersion technologies.

A dispersant, which is a kind of surfactant, includes a head and a tail. Here, it is desirable for the head to have an affinity for a dispersoid (e.g., the nanotubes), which is the material to be dispersed, and it is desirable for the tail to have an affinity for a dispersion medium, which is a solvent for dispersing materials. Moreover, it is desirable for a good dispersant to also serve as a barrier for the collision between particles.

Water-based dispersants, such as sodium dodecyl benzene sulfonate (NaDDBS), sodium dodecyl sulfonate, TX-100, polyvinyl pyrrolidone and the like, are used as conventional dispersants for carbon nanotubes. However, there is a problem in that water-based dispersants can easily disperse carbon nanotubes only in water, but cannot effect the dispersing of the carbon nanotubes in an organic solvent.

Further, organic dispersants are not widely known yet. However, Korean Unexamined Application Publication No. 2004-0039425 and Japanese Unexamined Application Publication No. 2004-339301 have disclosed the fact that carbon nanotubes can be easily dispersed in an organic solvent using a polythiophene conjugated polymer. However, the use of a polythiophene polymer has drawbacks, not the least of which is the lack of control over the molecular weight of the polythiophene. The lack of control over the molecular weight causes limited dispersion of the carbon nanotubes in only two or three types of media.

Accordingly, it is desirable to have a dispersant to disperse carbon nanotubes in various solvents, including organic solvents, water-based solvents, and mixtures thereof.

SUMMARY OF THE INVENTION

Accordingly, in one embodiment, a dispersant for carbon nanotubes including a molecule having a head that comprises an aromatic ring and a tail in which the tails are regioregularly arranged. The dispersant can improve the dispersion of carbon nanotubes by controlling the structural properties of the dispersant.

In another embodiment, a carbon nanotube composition comprises a dispersant having a structure that can improve the dispersion of carbon nanotubes.

In yet another embodiment, a dispersant for carbon nanotubes comprises heads and tails, in which the tails are regioregularly arranged.

In yet another embodiment, it is preferred that the ratio of heads to tails be 1 or more.

In yet another embodiment, a carbon nanotube composition comprises a dispersant having the aforementioned structure, carbon nanotubes, and a dispersion medium selected from the group consisting of an organic solvent, water, and a mixture thereof.

The composition may include about 0.001 to about 10 wt % (weight percent) of a dispersant, about 0.01 to about 5 wt % of carbon nanotubes, and a balance of dispersion medium, based on the total weight of the composition.

BRIEF DESCRIPTION OF THE DRAWINGS

The above and other features and advantages will be more clearly understood from the following detailed description taken in conjunction with the accompanying drawings, in which.

DESCRIPTION OF THE PREFERRED EMBODIMENTS

Hereinafter, the structure of a dispersant for carbon nanotubes will be described in detail with reference to the attached drawings.

In the design of a dispersant for dispersing carbon nanotubes, it is desirable for (a) the heads of a dispersant to adhere to the hydrophobic surface of carbon nanotubes, (b) the tails of a dispersant to facilitate dissolution in a solvent. It is desirable for the dispersant to have a density high enough to prevent the aggregation of carbon nanotubes when carbon nanotubes are in a position to contact one another.

The structure of a dispersant for carbon nanotubes is characterized in that the structural properties thereof are controlled such that tails are regioregularly arranged.

Figure 1A:
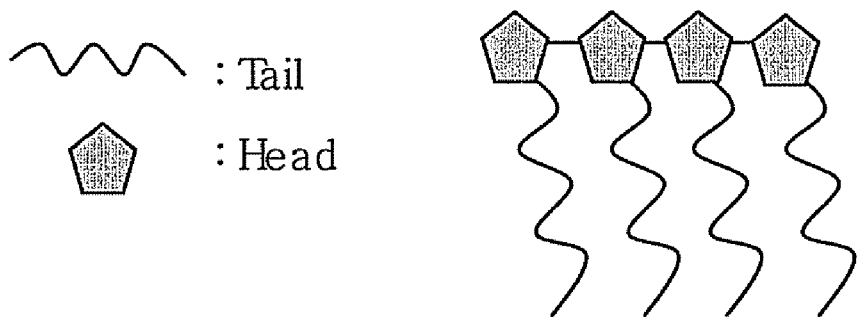
FIGS. 1A to 1C are schematic views showing the various structures of dispersants according to an embodiment.
Figure 1B:
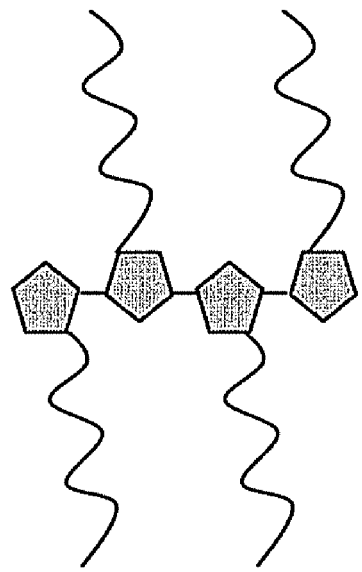
Figure 1C:
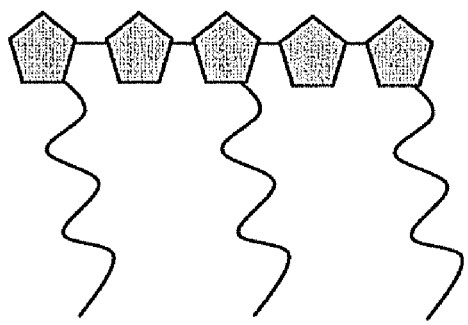
Figure 2:
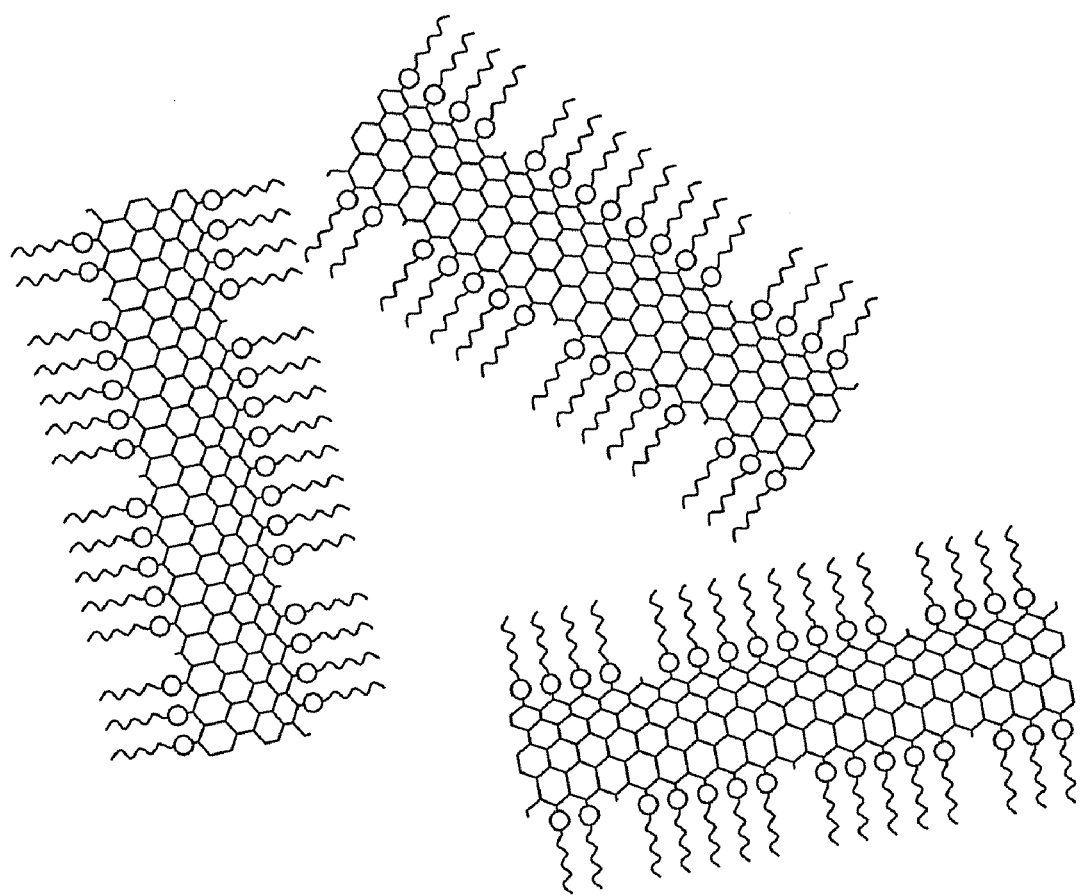
FIG. 2 is a schematic view showing the state in which carbon nanotubes are dispersed by a dispersant according to an embodiment.

As shown in FIG. 1A to 1C, since the dispersant has a structure (FIG. 1A) in which heads are regularly arranged and carbon nanotubes also have a structure in which atoms are regularly arranged, the dispersant is more effectively adsorbed on the carbon nanotubes than a conventional dispersant having a structure (FIG. 1B) in which heads and tails are irregularly arranged, thereby decreasing dispersion efficiency. FIG. 2 schematically shows the state in which carbon nanotubes are dispersed by a dispersant according to an embodiment.

Further, the dispersant for carbon nanotube is characterized in that the dispersion efficiency of the dispersant is improved by controlling the ratio of heads to tails. In this case, it is preferred that the ratio of heads to tails be 1 or more.

In a dispersant, the ratio of heads to tails is the ratio of the number of heads to the number of tails. Here, if the number of heads is greater than the number of tails, the adsorption function effected by the heads is strengthened relative to the dispersion function that is effected by the tails. In contrast, if the number of heads is lower than the number of tails, the dispersion function effected by the tails is strengthened relative to the adsorption function that is effected by the heads.

More specifically, the conditions for optimizing the dispersion of carbon nanotubes is as follows: 1) when carbon nanotubes collide with one another and aggregate with each other, it is desirable for the heads of the dispersant to continue to be attached to the surface of the carbon nanotubes, and 2) it is desirable for the tails of the dispersant to have a high density per unit surface area of the carbon nanotubes, such that they have sufficient repulsive force that acts against the attractive force between the carbon nanotubes. Accordingly, in order to maximize dispersion using the given carbon nanotubes and dispersant, it is desirable to control the ratio of heads to tails. That is, when the ratio of heads to tails is increased, compared to the case where this ratio is 1, the adsorptive force of the heads with the carbon nanotubes is increased, but the repulsive force of the tails is decreased. Therefore, when the given carbon nanotubes are dispersed using a predetermined dispersant, an optimum ratio is desirable depending on the adsorptive force between the carbon nanotubes and the dispersant and on the repulsive force between the tails. With regard to carbon nanotubes, since the heads of the dispersant have low adsorptivity, it is desirable to increase the ratio of heads to tails so that the adsorptive force between the carbon nanotubes and the heads of the dispersant is increased, thereby improving the dispersibility of the carbon nanotubes. However, when the ratio of heads to tails is increased above a critical value, the repulsive force of the tails is decreased due to the decrease in the density of the tails, and thus an optimum ratio of heads to tails is maintained.

It is preferred that the heads of the dispersant, as represented by the following formula 1, be formed of atoms having many electrons, such as sulfur, nitrogen and the like, and aromatic rings, which have a high affinity for the carbon in the carbon nanotubes.

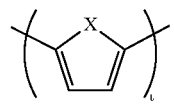

Formula (1)

wherein X is S, NH or O, and L is an integer of about 1 to about 60.

Accordingly, the heads can easily donate electrons to carbon nanotubes, can form a π-π coupling between the carbon nanotubes and the electrons, and can be adsorbed on the carbon nanotubes in an arrangement in which the carbon nanotubes are wrapped in comb structures, as shown in FIG. 2, thereby making it easy to disperse the carbon nanotubes in any dispersion medium.

It is preferred that the tails connected with the heads have the structure represented by the following formula (2), such that the tails have high affinity both for organic solvents, containing carbon (C), hydrogen (H) and the like, and for water-based solvents.

Formula (2)

wherein Y is selected from the group consisting of a substituted or unsubstituted alkylene group of 1 to about 10 carbon atoms, a substituted or unsubstituted alkenylene group of 1 to about 10 carbon atoms, a substituted or unsubstituted alkynylene group of 1 to about 10 carbon atoms, and a substituted or unsubstituted arylalkylene group of about 6 to about 20 carbon atoms, Z is selected from the group consisting of —H, —CH$_3$, —OH, carboxyl acid or salts thereof, sulfonic acid or salts thereof, and phosphoric acid or salts thereof, a is 0 or 1, m is an integer of 1 to about 9, and n is an integer of 0 to about 9.

Accordingly, the dispersant, which includes the tails, makes it easy to disperse carbon nanotubes in various dispersion media including an organic solvent, water, a mixture of two or more organic solvents, a mixture of one or more polar solvents and water, and the like.

The tails serve to prevent the collision and aggregation between carbon nanotube particles because they spread out in all directions from the heads and thus cause a steric hindrance effect and electrostatic repulsion.

In the formula (2), when a is 0, the hydrophobicity is increased and carbon nanotubes are easily dispersed in organic solvents. In contrast, when a is 1, the hydrophilicity is increased and carbon nanotubes are easily dispersed in polar solvents, water, or a mixture thereof. In this case, this dispersion effect is due to the steric hindrance effect.

Moreover, when carboxyl acid or a salt thereof, sulfonic acid or a salt thereof, or phosphoric acid or a salt thereof is introduced into Z, since electrostatic repulsion can be induced, carbon nanotubes can be more effectively dispersed in polar solvents, water, or the like, or a mixture thereof.

Meanwhile, in the formula (2), specifically, the unsubstituted alkylene group of 1 to 10 carbon atoms may include methylene, ethylene, propylene, iso-butylene, sec-butylene, pentylene, iso-amylene, hexylene and the like. Further, one or more hydrogen atoms of the alkylene group may be substituted with a halogen atom, a hydroxyl group, a nitro group, a cyano group, an amino group, an amidino group, hydrazine, hydrazone, carboxyl acid or salts thereof, sulfonic acid or salts thereof, or phosphoric acid or salts thereof.

The unsubstituted alkenylene or alkynylene group of 1 to about 10 carbon atoms has a carbon double bond or a carbon triple bond at the middle or end portion of the alkylene group. Specifically, the unsubstituted alkenylene or alkynylene group may include ethylene, propylene, butylene, hexylene, acetylene, and the like. Further, one or more hydrogen atoms of the unsubstituted alkenylene or alkynylene group may be substituted with a halogen atom, a hydroxyl group, a nitro group, a cyano group, an amino group, an amidino group, hydrazine, hydrazone, carboxyl acid or salts thereof, sulfonic acid or salts thereof, or phosphoric acid or salts thereof.

In the arylalkylene group, some of the hydrogen atoms in an arylene group, which is a carbocycle aromatic system of about 6 to about 20 carbon atoms including one or more rings, are substituted with radicals such as methylene, ethylene, propylene and the like. Examples of the arylalkylene group are a benzylene group, a phenylethylene group, and the like. One or more hydrogen atoms of the arylalkylene group may be substituted with a halogen atom, a hydroxyl group, a nitro group, a cyano group, an amino group, an amidino group, hydrazine, hydrazone, carboxyl acid or salts thereof, sulfonic acid or salts thereof, or phosphoric acid or salts thereof.

In the present invention, it is preferred that the tail be a polyethyleneoxide of about 3 to about 20 carbon atoms, but it is not limited thereto.

Hereinafter, a carbon nanotube composition containing a dispersant will be described.

A carbon nanotube composition includes a dispersant having the aforementioned structure; carbon nanotubes; and an organic solvent, water, or a mixture thereof.

The carbon nanotube composition includes about 0.001 to about 10 wt % of the dispersant; about 0.01 to about 5 wt % of carbon nanotubes; and a balance of dispersion medium, based on the total weight of the composition.

In this case, it is preferred that the weight ratio of the carbon nanotube to the dispersant is in an amount of about 1:0.001 to about 1:10. The reason is that, when the amount of the dispersant is excessively small, appropriate dispersion of nanotubes cannot be obtained, and in contrast, when the amount of the dispersant is excessively large, there is a negative effect on the dispersion of carbon nanotubes.

The carbon nanotube, can be selected from the group consisting of a single-walled nanotube, a double-walled nanotube, a multi-walled nanotube and a bundled nanotube.

The dispersion medium can comprise organic polar solvents, organic non-polar solvents, or a combination comprising at least one of the foregoing solvents.

The dispersion medium, which can be used in the present invention, can comprise an organic solvent, water, a mixture of two or more organic solvents, and a mixture of one or more polar solvents and water, but is not limited thereto.

In this case, the organic solvent may be one or more selected from the group consisting of alcohols, including methylalcohol, ethylalcohol, n-propylalcohol, iso-propylalcohol, n-butylalcohol, sec-butylalcohol, t-butylalcohol, iso-butylalcohol, and diacetone alcohol; ketones including acetone, methylethylketone, and methylisobutylketone; glycols including ethyleneglycol, diethyleneglycol, triethyleneglycol, propyleneglycol, butyleneglycol, hexyleneglycol, 1,3-propanediol, 1,4-butanediol, 1,2,4-butanetriol, 1,5-pentanediol, 1,2-hexanediol, and 1,6-hexanediol; glycol ethers including ethyleneglycol monomethyl ether, and triethyleneglycol monoethyl ether; glycol ether acetates including propyleneglycol monomethyl ether acetate (PGMEA); acetates including ethylacetate, butoxyethoxy ethyl acetate, butyl carbitol acetate (BCA), and dihydroterpineol acetate (DHTA); terpineols; trimethyl pentanediol monoisobutyrate (TEXANOL); dichloroethene (DCE); and 1-methylpyrrolidone (NMP).

Meanwhile, the composition, if desired, may further include one or more additives selected from the group consisting of an organic binder, a photosensitive monomer, a photoinitiator, a viscosity modifier, a storage stabilizer, a wetting agent, and an acid or a base within a range in which the material properties of the composition are maintained.

In this case, the amount of the additive may be about 0.1 to about 60 parts by weight, based on 100 parts by weight of the composition.

The organic binder, which can be used in the present invention, can comprise celluloses including ethylcellulose, styrenes, a styrene-acrylic acid ester copolymer, polyvinylbutyral, polyvinylalcohol, and polypropylene carbonate, and the like. It is preferred that a cellulose binder composed of ethylcellulose or a mixture thereof be used.

Any common photosensitive monomers and photoinitiators can be used as the photosensitive monomer and photoinitiator. Specifically, the photosensitive monomer can include a thermally-degradable acrylate monomer, a benzophenone monomer, an acetophenone monomer, a thioksantone monomer, and the like.

Any common viscosity modifiers and storage stabilizers can also be used. Specifically, the viscosity modifier may include casein, carboxymethyl cellulose, and the like.

Further, wetting agents can also be used. Specifically, polyvalent alcohols, including glycerin, ethylene glycol, diethylene glycol, triethylene glycol, propylene glycol, dipropylene glycol, 1,3-butanediol, 1,4-butanediol, 1,5-pentanediol, 1,2-hexanediol, 2-methyl-2-pentanediol and the like, may be used as the wetting agent.

The composition may further include an acid or a base. The acid or base serves to increase the solubility of a dispersant in the solvent, and serves to stabilize the dispersion of the carbon nanotubes by imparting an electrostatic repulsive force to the dispersed carbon nanotube particles. Here, hydrochloric acid, sulfuric acid, nitric acid, acetic acid, carbonic acid, and the like, may be used as the acid, and sodium hydroxide, potassium hydroxide, calcium hydroxide, ammonium hydroxide, and the like, may be used as the base.

The composition comprising the dispersant, the carbon nanotubes, the solvent along with desired additives and resins can be blended together to form a uniform isotropic composition. The blending can be melt or solution blending. Blending is generally conducted in a device where shear, elongational and extensional forces are simultaneously or sequentially applied. An exemplary blender is an extruder such as a single or twin screw extruder, a buss kneader, a Henschel mixer or a Waring blender.

The composition can be applied to various industrial fields in which aqueous or oily carbon nanotube compositions can be used. Specifically, the composition can be used for producing an emitter of a field emission display (FED), a carbon nanotube ink, or a printable carbon nanotube.

Hereinafter, preferred embodiments will be described in detail with reference to Examples. Here, these Examples are set forth to illustrate the present invention, but should not to be construed as the limitations of the present invention.

First, in order to evaluate the dispersion ability of a dispersant having a structure according to the present invention, six dispersants having structural properties different from each other were provided, as shown in the following Table 1. Hereinafter, the six dispersants will be described in detail.

TABLE 1

| Sample name | | Structure | Regio-regularity | Head/Tail |
|---|---|---|---|---|
| 3-Hexylthiophene | | (thiophene with $C_6H_{13}$) | | 1 |
| Designed thiophene | $H_{6, RR}$ | (poly-3-hexylthiophene, $C_6H_{13}$)$_6$ | Regioregular | 1 |
| | $H_{12, RR}$ | (bithiophene with two $C_6H_{13}$)$_6$ | Regioregular | 1 |
| | $H_{12, RRa}$ | (bithiophene with $C_6H_{13}$ groups, regiorandom)$_6$ | Regiorandom | 1 |
| | $H_{12, RRa}$ (H/T = 2) | (bithiophene structure)$_6$ with $C_6H_{13}$ | Regiorandom | 2 |
| | $H_{12, RRa}$ (H/T = 3) | (terthiophene structure)$_4$ with $C_6H_{13}$ | Regiorandom | 3 |

*In $H_{6,12,RR,RRa}$ of Table 1, 6 indicates that it has six aromatic rings, 12 indicates that it has twelve aromatic rings, RR represents regioregular, and RRa represents regiorandom.

Preparation Example 1

Synthesis of Dispersant 2 and Dispersant 3 (Regioregular)

The polymerization of a dispersant having a regioregular structure, in which head and tails are arranged in one direction, was performed using a nickel (Ni) catalyst as follows.

First, 1.48 g (61.32 mmol) of Mg (magnesium) and 100 mL of THF (tetrahydrofuran) were put into a reactor. Subsequently, $I_2$ (iodine) was added thereto while heating the reactor, 20 g (61.32 mmol) of 2,5-dibromo-3-hexylthiophene was slowly added thereto, and the mixture was then refluxed until the Mg had completely melted. Next, 0.96 g (1.83 mmol) of $NiCl_2$(dppp) (nickel chloride) was added thereto and the mixture was then refluxed for 5 hours to form a reaction product. After the reaction was completed, the reaction product was cooled to room temperature, and was then extracted by removing the solvent therefrom and dissolving it in EDC (ethylene dichloride). The solid that was not dissolved in the EDC was filtered to form a solution, and the solvent was removed from the solution using an evaporator, and the solid was then dried in a vacuum, thereby obtaining a red solid. The obtained red solid was extracted through a solvent extraction method, thereby preparing a dispersant 2 and a dispersant 3 depending on molecular weight.

Preparation Example 2

Synthesis of Dispersant 4 (Regiorandom)

The polymerization of a dispersant having a regiorandom structure, in which heads and tails are irregularly arranged, was performed using a $FeCl_3$ (iron chloride) catalyst as follows.

First, 19.27 g (118.83 mmol) of $FeCl_3$ and 100 mL of $CHCl_3$ (chloroform) were put into a reactor in an argon atmosphere, and were then cooled to a temperature of 0° C. Subsequently, 5 g (29.70 mmol) of 3-hexylthiophene was slowly added to the reactor, and the mixture was then stirred at the same temperature for 30 minutes to form a reaction product. After the reaction was completed, the reaction product was put in 800 mL of methanol, and the mixture was then stirred for 1 hour to form a solid in a methanol solution. Next, the solid formed in the methanol solution was filtered. Then, the filtered solid was put in 200 mL of a 30% ammonium chloride solution, stirred for about 1 hour, and then extracted using EDC. The solid that was not dissolved in the EDC was filtered to form a solution, and the solvent was removed from the solution using an evaporator, and was then dried in vacuum, thereby obtaining a red solid (a dispersant 4).

Preparation Example 3

Synthesis of Dispersant 5 (Head/Tail=2)

A dispersant 5 was synthesized through the processes shown in the following Table 2.

First Process: Synthesis of Compound 1

3-bromothiophene (28 mL, 300 mmol) and $NiCl_2$(dppp) (0.8 g, 1.5 mmol) were dissolved in ether (250 mL), and then hexylmagnesium bromide, which is a compound obtained by reacting magnesium (8.75 g, 360 mmol) with hexyl bromide (49.5 g, 420 mmol) in ether (250 mL), was slowly added thereto at a temperature of 0° C. Subsequently, the mixed solution was heated to room temperature and was then refluxed to form a reaction product. After the reaction was completed, the reaction product was added with ammonium chloride (aq.), and was then extracted using ether. Next, the extracted reaction product was refined through a reduced-pressure distillation, thereby obtaining 41.0 g (244 mmol, 81%) of compound 1.

$^1$H NMR ($\delta$, $CDCl_3$): 7.10 (d, 1H), 6.88 (d, 1H), 6.84 (s, 1H), 2.58 (t, 2H), 1.59 (m, 2H), 1.26 (m, 8H), 0.88 (m, 3.7H).

Second Process: Synthesis of Compound 2

Compound 1 (41 g, 244 mmol) was put in THF (500 mL) and cooled to a temperature of −20° C., and then N,N,N,N-tetramethyl-ethylenediamine (40.21 mL, 268 mmol) was added thereto. After 30 minutes, the mixed solution was cooled to a temperature of −78° C., and then n-BuLi (1.6 M in hexane, 160 mL) was added thereto, and the mixture was heated to room temperature and then refluxed for 3 hours. Next, the mixed solution was cooled to a temperature of −78° C. again, and then 2-isopropoxy-4,4,5,5-tetramethyl-1,3,2-dioxabororane (60 mL, 293 mmol) was added thereto. Subsequently, the mixed solution was slowly heated to room temperature, and was then left at room temperature for one day. Next, the mixed solution was extracted using $H_2O$ (water) and $CH_2Cl_2$ (dichloromethane), and was then separated using a silica gel column, thereby obtaining 50.3 g (171 mmol, 70%) of compound 2.

$^1$H NMR ($\delta$, $CDCl_3$): 7.46 (s, 1H), 7.20 (s, 1H), 2.61 (t, 2H), 1.59 (m, 2H), 1.30 (m, 22H), 0.88 (t, 4H).

Third Process: Synthesis of Compound 3

Compound 3 was synthesized using the same method as in compound 1.

Fourth Process: Synthesis of Compound 4

Compound 3 (8 g, 48 mmol) was dissolved in chloroform (50 mL) and AcOH (acetic acid) (150 mL), and was then cooled to a temperature of 0° C. Subsequently, NBS (what is NBS?) (8.55 g, 48 mmol) was slowly added thereto in small amounts while light was blocked. Next, the mixed solution was quenched using $Na_2SO_3$ (sodium sulfite) (aq.) and then extracted using hexane. Finally, 7.4 g (30 mmol, 63%) of a white solid was obtained through a recrystallization method.

Fifth Process: Synthesis of Compound 5

2-bromothiophene (5.3 g, 32 mmol), compound 2 (10.5 g, 35.5 mmol), $K_2CO_3$ (potassium carbonate) (10.09 g, 102 mmol), and $Pd(PPh_3)_4$ (Tetrakis(triphenylphosphine)-palladium(0)) (3.9 g, 3.4 mmol) were put in dimethoxyethane (150 mL) and $H_2O$ (100 mL), and were then refluxed. Subsequently, the mixed solution was supplied with ammonium chloride (aq.), was extracted using chloroform, and was then refined through a reduced-pressure distillation, thereby obtaining 6.1 g (24.4 mmol, 76%) of compound 5.

$^1$H NMR ($\delta$, $CDCl_3$): 7.10 (m, 2H), 6.98 (d, 1H), 6.93 (dd, 1H), 6.73 (d, 1H), 2.56 (t, 2H), 1.59 (m, 2H), 1.26 (m, 8H), 0.88 (m, 4H).

Sixth Process: Synthesis of Dispersant 5

Anhydrous $FeCl_3$ (11.7 g, 72 mmol) was put in chloroform (150 mL), and was then cooled to a temperature of 0° C. Subsequently, compound 5 (6 g, 24 mmol) was dissolved in chloroform (20 mL), and was slowly dropped into the $FeCl_3$ solution. After the reaction was completed, the mixed solution was precipitated by putting it in methyl alcohol. Subsequently, the precipitated mixture was filtered, and thus a solid was obtained, and then the obtained solid was put in $NH_4OH$ (aq.) and stirred at room temperature. Here, in the case where the solid appeared red, the solid was filtered, was cleaned using methyl alcohol several times, and was then dried, obtaining 4 g of sample.

Preparation Example 4

Synthesis of Dispersant 6 (Head/Tail=3)

6 g of sample was obtained by synthesizing compound 6 (compound 6 was prepared using the same method as compound 5) in the following Table 2 using the same method as in the Preparation Example 3 in the sixth process.

TABLE 2

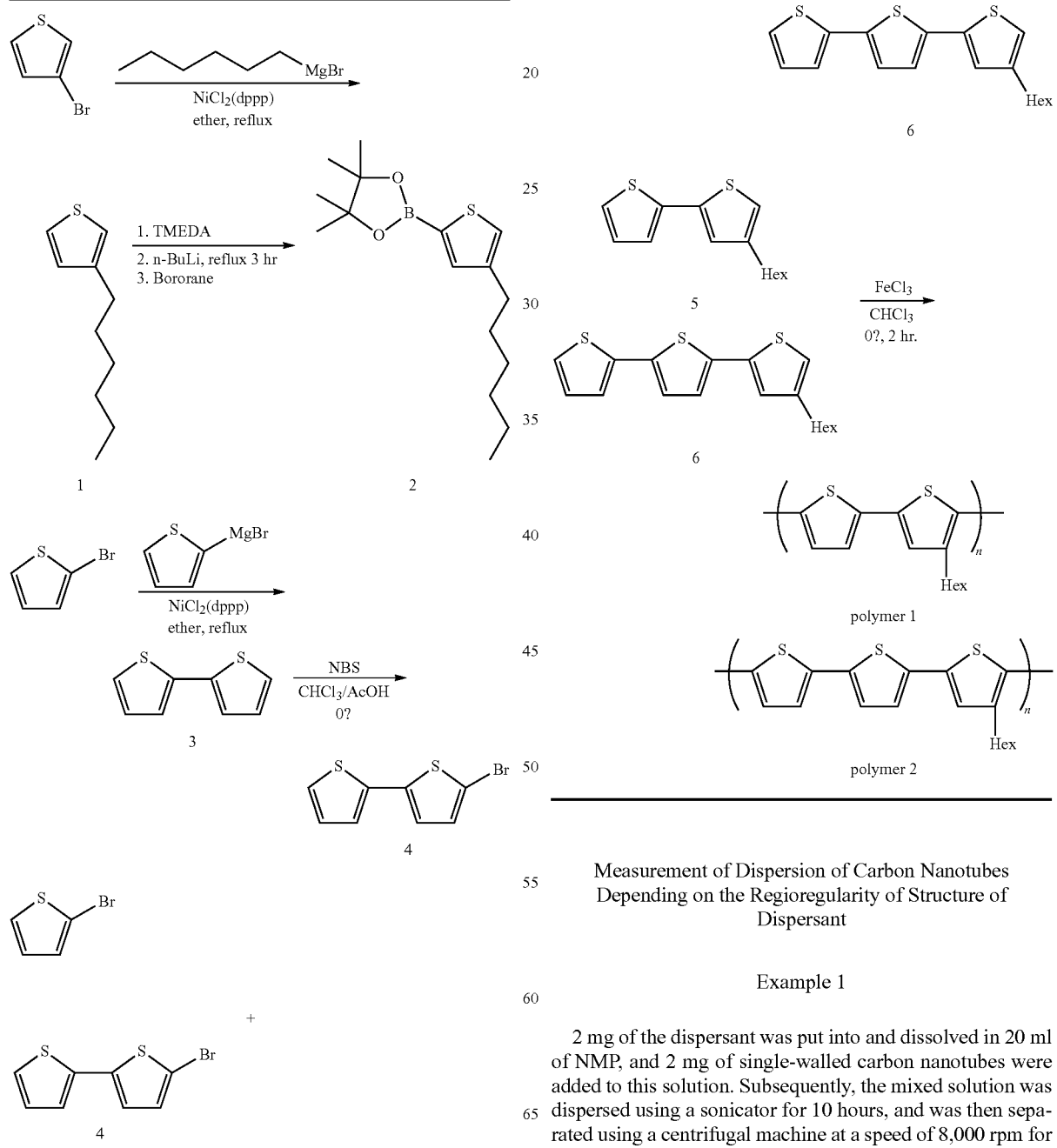

TABLE 2-continued

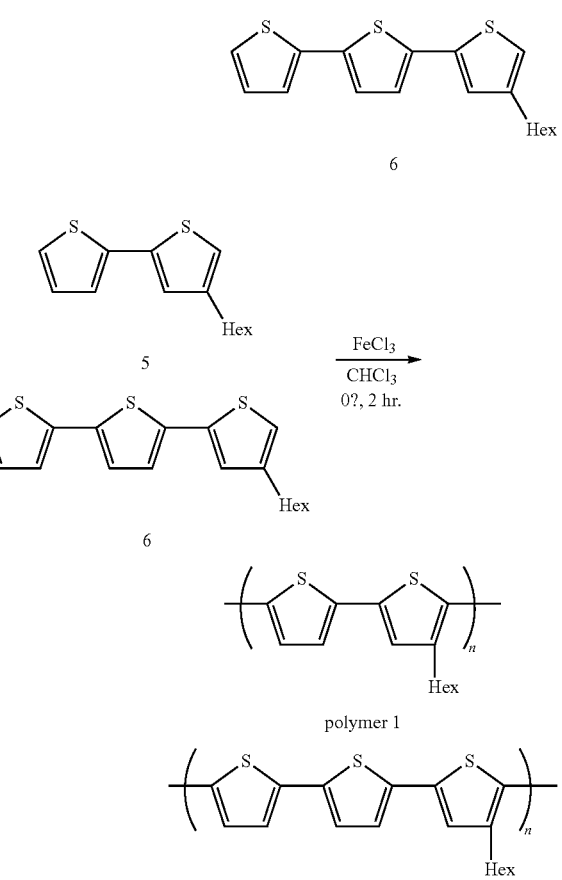

Measurement of Dispersion of Carbon Nanotubes Depending on the Regioregularity of Structure of Dispersant Example 1

2 mg of the dispersant was put into and dissolved in 20 ml of NMP, and 2 mg of single-walled carbon nanotubes were added to this solution. Subsequently, the mixed solution was dispersed using a sonicator for 10 hours, and was then separated using a centrifugal machine at a speed of 8,000 rpm for 10 minutes, thereby obtaining a carbon nanotube solution.

Example 2

A carbon nanotube was obtained using the same method as in Example 1, except that the dispersant 3 was used as a dispersant.

Comparative Example 1

A carbon nanotube was obtained using the same method as in Example 1, except that the dispersant 1 was used as a dispersant.

Comparative Example 2

A carbon nanotube was obtained using the same method as in Example 1, except that the dispersant 4 was used as a dispersant.

Evaluation of Dispersion Efficiency

In the Examples and Comparative Examples, dispersion efficiency was evaluated using the following methods.

Generally, the dispersion of carbon nanotubes can be classified as a macrodispersion or a nanodispersion. Macrodispersion is a state in which the bundle of carbon nanotubes is not completely disentangled from the agglomerate, but is dispersed in a solvent. The macrodispersion can be evaluated by examining the absorbance of carbon nanotubes in the UV-Vis-IR spectrum. A high absorbance obtained in a UV-Vis-IR spectrum means that the carbon nanotubes are well dispersed.

In contrast, nanodispersion is a state in which the carbon nanotube strands are completely separated from the bundle of carbon nanotubes and are dispersed in a solution. The nanodispersion can be evaluated by evaluating the sharpness of the characteristic carbon nanotube peak, rather than the absorbance of carbon nanotubes, in the UV-Vis-IR spectrum. A sharp characteristic carbon nanotube peak means that the carbon nanotubes are well dispersed in the nano state.

In the present invention, the nano dispersity of the carbon nanotubes was evaluated by evaluating the main peak sharpness around 1006 nm, in which the $E_{11}^s$ characteristics of carbon nanotubes are exhibited, using UV-Vis-NIR spectroscopy. The sharpness of peak can be determined using the ratio of height to width at the half maximum point of the peak. This method has been used by Resasco, et al., and can be used as a method of evaluating the nano dispersity of carbon nanotubes (J. Phys. Chem. B2005, 109, 14454).

Figure 3A:
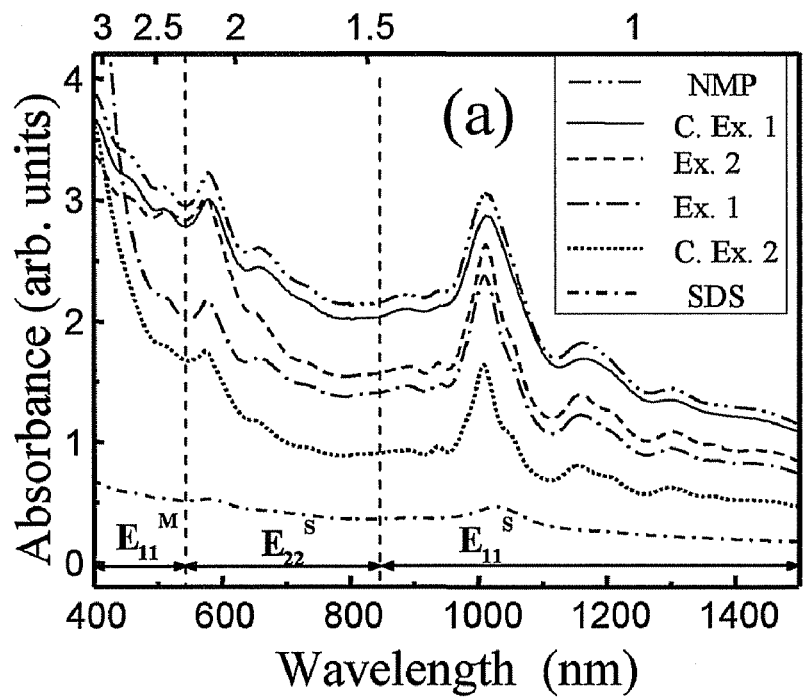
FIG. 3A is a graph showing the UV-Vis-NIR Spectroscopy characteristic curves of a carbon nanotube solution based on the structure (regioregularity) of a dispersant.
Figure 3B:
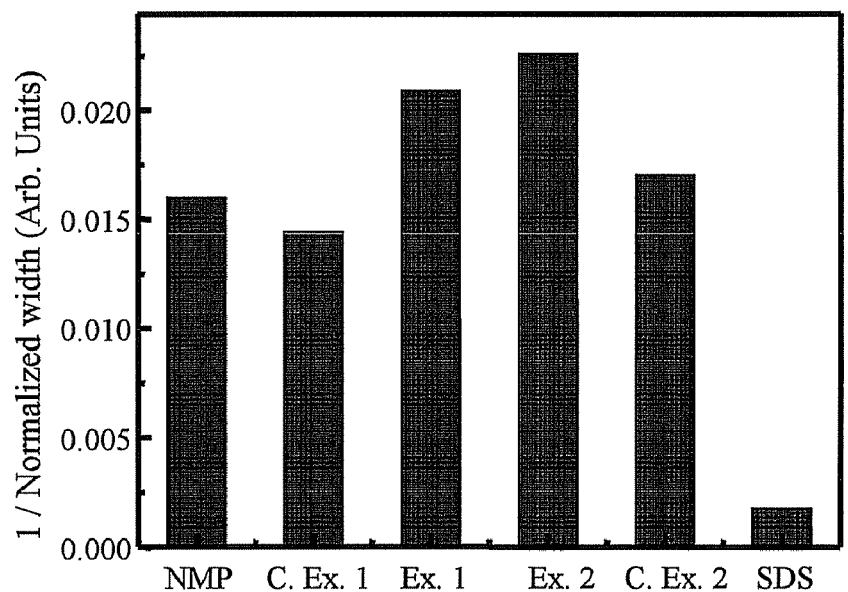
FIG. 3B is a dispersity evaluation graph using the UV-Spectroscopy characteristic curves.

FIGS. 3A and 3B show the dispersion efficiency related to the structural properties of a dispersant, which is evaluated using these measuring methods.

As shown in FIGS. 3A and 3B, it can be seen that a regioregular structured dispersant (Example 2) according to the present invention has better dispersion efficiency than a regiorandom structured dispersant (Comparative Example 2). Further, it can be seen that a polymer dispersant (Examples 1 and 2) has better dispersion efficiency than a monomer dispersant (Comparative Example 1), and, when using the same polymer dispersant, a high molecular weight dispersant (Example 2) has better dispersion efficiency than a low molecular weight dispersant (Example 1).

In FIGS. 3A and 3B, the data represented by NMP (N-methyl pyrrolidone) reflect the case where carbon nanotubes are dispersed using only an NMP solvent, which is the solvent used in the present invention, without the use of a dispersant, and the data represented by SDS (sodium dodecyl sulfate) reflect the case where carbon nanotubes are dispersed in NMP using SDS, which is known to be a very effective dispersant in the conventional art. Here, it can be seen that the dispersant according to the present invention exhibits much better characteristics than in the case where no dispersant is used (NMP) and in the case where the conventional dispersant (SDS) is used.

Measurement of Dispersion of Carbon Nanotubes Depending on the Ratio of Heads to Tails of Structure of Dispersant

Example 3

A carbon nanotube was obtained using the same method as in Example 1, except that the dispersant 5 was used as a dispersant.

Example 4

A carbon nanotube was obtained using the same method as in Example 1, except that the dispersant 6 was used as a dispersant.

Evaluation of Dispersion Efficiency

Figure 4A:
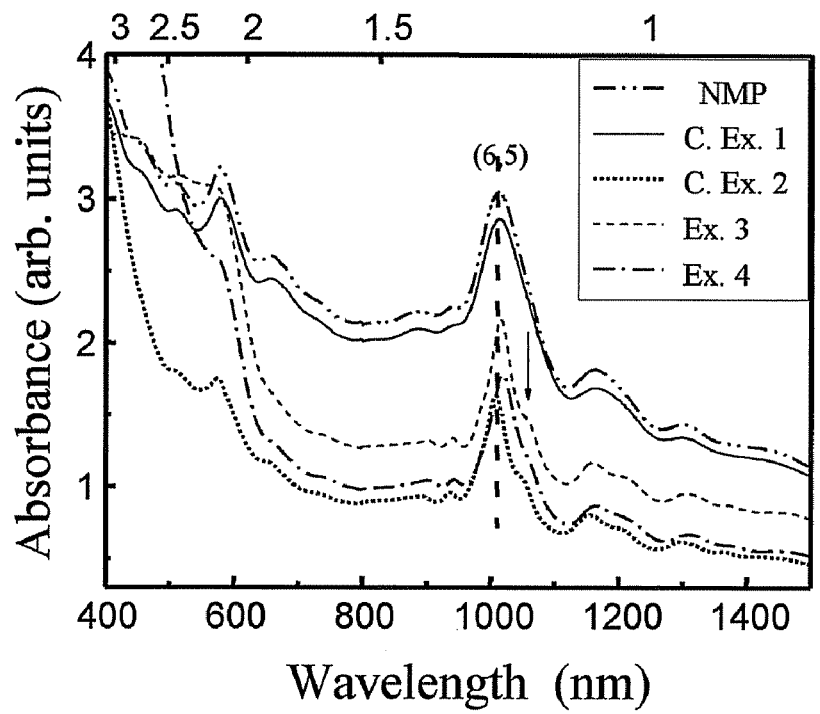
FIG. 4A is a graph showing the UV-Vis-NIR Spectroscopy characteristic curves of a carbon nanotube solution based on the structure (the ratio of heads to tails) of a dispersant.
Figure 4B:
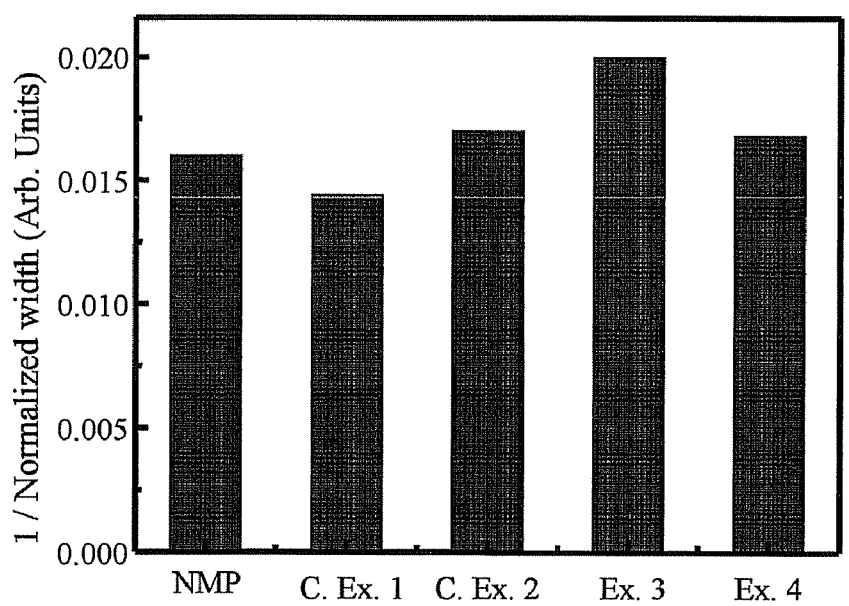
FIG. 4B is a dispersity evaluation graph using the UV-Vis-NIR Spectroscopy characteristic curves.

FIGS. 4A and 4B show the dispersion efficiency in Examples 3 to 4 and Comparative Examples 3 to 4, evaluated using the same method as in Examples 1 to 2 and Comparative Examples 1 to 2.

As shown in FIGS. 4A and 4B, it can be seen that the dispersion efficiency of a dispersant depending on the control of the ratio of heads to tails is best in the case where the ratio of heads to tails is 2 (Example 3).

As described above, when the tails of the dispersant are regioregularly arranged, and the structural properties of the dispersant are controlled such that the ratio of heads to tails is 1 or more, there is an effective stabilizing and dispersing of carbon nanotubes in various dispersion media, such as an organic solvent, water, a mixture thereof and the like, compared to conventional dispersants.

Accordingly, when the dispersant is used, there is an advantage in that carbon nanotube compositions such as those used in various industrial fields for producing emitters for field emission displays (FEDs), carbon nanotube ink, and printable carbon nanotubes can be easily produced.

As described above, although the preferred embodiments have been disclosed for illustrative purposes, those skilled in the art will appreciate that various modifications, additions and substitutions are possible, without departing from the scope and spirit of the invention as disclosed in the accompanying claims.

What is claimed is:

1. A carbon nanotube composition comprising:
   carbon nanotubes;
   a dispersion medium selected from the group consisting of an organic solvent, water, and a mixture thereof; and
   a dispersant for the carbon nanotubes, comprising a head covalently bonded to a tail; the head having an aromatic ring; and wherein the tails are regioregularly arranged, wherein the head is selected from the group represented by the following Formula (1), and the tail is selected from the group represented by the following Formula (2):

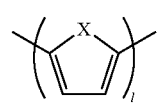

Formula (1)

wherein X is S, NH, or O, and
l is and integer of 2 to about 60;

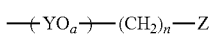 Formula (2)

wherein Y is selected from the group consisting of a substituted or unsubstituted alkenylene group of 1 to about 10 carbon atoms, a substituted or unsubstituted alkynylene group of 1 to about 10 carbon atoms, and a substituted or unsubstituted arylalkylene group of about 6 to about 20 carbon atoms, Z is selected from the group consisting of —H, —CH$_3$, —OH, carboxyl acid or salts thereof, sulfonic acid or salts thereof, and phosphoric acid or salts thereof, a is 0 or 1, m is an integer of 1 to about 9, and n is an integer of up to about 9, wherein the ratio of the heads to the tails is 2:1 or 3:1.

2. The dispersant according to claim 1, wherein the ratio of the heads to the tails is 2:1.

3. The dispersant according to claim 1, wherein, in the Formula (1), X is S.

4. The dispersant according to claim 1, wherein, in the Formula (1), l is an integer of about 10 to about 20.

5. The carbon nanotube composition according to claim 1, wherein the composition comprises about 0.001 to about 10 wt % of a dispersant; about 0.01 to about 5 wt % of carbon nanotubes; and a balance of the dispersion medium, based on the total weight of the composition.

6. The carbon nanotube composition according to claim 1, wherein a weight ratio of the carbon nanotube to the dispersant is in an amount of about 1:0.001 to about 1:10.

7. The carbon nanotube composition according to claim 1, wherein the carbon nanotube is one or more selected from the group consisting of a single-walled nanotube, a double-walled nanotube, a multi-walled nanotubes, a bundled nanotubes, or a mixture thereof.

8. The carbon nanotube composition according to claim 1, wherein the organic solvent is one or more selected from the group consisting of alcohols, including methylalcohol, ethylalcohol, n-propylalcohol, iso-propylalcohol, n-butylalcohol, sec-butylalcohol, t-butylalcohol, iso-butylalcohol, and diacetone alcohol; ketones, including acetone, methylethylketone, and methylisobutylketone; glycols, including ethyleneglycol, diethyleneglycol, triethyleneglycol, propyleneglycol, butyleneglycol, hexyleneglycol, 1,3-propanediol, 1,4-butanediol, 1,2,4-butanetriol, 1,5-pentanediol, 1,2-hexanediol, and 1,6-hexanediol; glycol ethers including ethyleneglycol monomethyl ether, and triethyleneglycol monoethyl ether; glycol ether acetates including propyleneglycol monomethyl ether acetate (PGMEA); acetates including ethylacetate, butoxyethoxy ethyl acetate, butyl carbitol acetate (BCA), and dihydroterpineol acetate (DHTA); terpineols; trimethyl pentanediolmonoisobutyrate (TEXANOL); dichloroethene (DCE); 1-methylpyrrolidone (NMP), or a combination comprising ate least one of the foregoing solvents.

9. The carbon nanotube composition according to claim 1, wherein the composition further comprises one or more additives selected from the group consisting of an organic binder, a photosensitive monomer, a photoinitiator, a viscosity modifier, a storage stabilizer, a wetting agent, and an acid or a base.

10. The carbon nanotube composition according to claim 9, wherein an amount of the additive is about 0.1 to about 60 parts by weight, based on 100 parts by weight of the composition.

11. The carbon nanotube composition according to claim 9, wherein the organic binder is one or more selected from the group consisting of celluloses, including ethylcellulose, styrenes, a styrene-acrylic acid ester copolymer, polyvinylbutyral, polyvinylalcohol, and polypropylene carbonate.

12. A method comprising:
blending a dispersant; carbon nanotubes; and a dispersion medium selected from the group consisting of an organic solvent, water, and a mixture thereof; the dispersant comprising a plurality of heads covalently bonded to a plurality of tails; the heads comprising an aromatic ring; and wherein the tails are regioregularly arranged, wherein the head is selected from the group represented by the following Formula (1), and the tail is selected from the group represented by the following Formula (2):

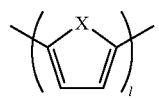 Formula (1)

wherein X is S, NH, or O, and
l is and integer of 2 to about 60;

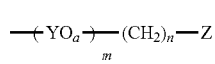 Formula (2)

wherein Y is selected from the group consisting of a substituted or unsubstituted alkenylene group of 1 to about 10 carbon atoms, a substituted or unsubstituted alkynylene group of 1 to about 10 carbon atoms, and a substituted or unsubstituted arylalkylene group of about 6 to about 20 carbon atoms, Z is selected from the group consisting of —H, —CH$_3$, —OH, carboxyl acid or salts thereof, sulfonic acid or salts thereof, and phosphoric acid or salts thereof, a is 0 or 1, m is an integer of 1 to about 9, and n is an integer of up to about 9, wherein the ratio of the heads to the tails is 2:1 or 3:1.

13. The method of claim 12, wherein the blending comprises melt blending or solution blending.

14. The method of claim 12, wherein the blending is conducted in an extruder.

15. A carbon nanotube composition comprising:
carbon nanotubes;
a dispersion medium selected from the group consisting of an organic solvent, water, and a mixture thereof; and
a dispersant for the carbon nanotubes, comprising a head covalently bonded to a tail; the head having an aromatic ring; and wherein the tails are regioregularly arranged, wherein the head is selected from the group represented by the following Formula (1), and the tail is polyethyleneoxide having about 3 to about 9 carbon atoms or polypropyleneoxide of about 4 to about 9 carbon atoms:

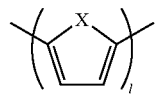 Formula (1)

wherein X is S, NH, or O, and
l is and integer of 2 to about 60, wherein the ratio of the heads to the tails is 2:1 or 3:1.

* * * * *